(12) United States Patent
Taylor (10) Patent No.: US 12,241,457 B1
(45) Date of Patent: Mar. 4, 2025

(54) RENEWABLE GEOTHERMAL ENERGY HARVESTING SYSTEMS AND METHODS

(71) Applicant: Mark H. Taylor, Gibsland, LA (US)

(72) Inventor: Mark H. Taylor, Gibsland, LA (US)

( * ) Notice: Subject to any disclaimer, the term of this patent is extended or adjusted under 35 U.S.C. 154(b) by 37 days.

(21) Appl. No.: 17/894,546

(22) Filed: Aug. 24, 2022

(51) Int. Cl.
  *F03G 7/04* (2006.01)
  *F24T 10/10* (2018.01)
  *F24T 10/30* (2018.01)

(52) U.S. Cl.
  CPC .............. *F03G 7/04* (2013.01); *F24T 10/10* (2018.05); *F24T 10/30* (2018.05)

(58) Field of Classification Search
  CPC ... F03G 7/04; F24T 10/30; F24T 10/10; F24T 10/20; F24T 50/00; F24T 10/15; Y02E 10/10; Y02E 20/14; Y02B 10/70; Y02B 10/40
  See application file for complete search history.

(56) References Cited

U.S. PATENT DOCUMENTS

| | | | | |
|---|---|---|---|---|
| 4,031,956 A | * | 6/1977 | Terry | ............... E21B 43/243 166/245 |
| 4,059,959 A | * | 11/1977 | Matthews | ............... F03G 7/04 261/DIG. 11 |
| 5,515,679 A | | 5/1996 | Shulman | |
| 8,820,394 B2 | | 9/2014 | Azzam | |
| 10,995,972 B2 | | 5/2021 | Buscheck | |
| 11,434,880 B1 | * | 9/2022 | Taylor | ............... F03G 4/026 |
| 2009/0126923 A1 | | 5/2009 | Montgomery et al. | |
| 2009/0321040 A1 | * | 12/2009 | Poitras | ............... F24T 10/30 165/45 |
| 2011/0067399 A1 | | 3/2011 | Rogers et al. | |
| 2012/0001429 A1 | | 1/2012 | Saar et al. | |
| 2012/0174581 A1 | | 7/2012 | Vaughan | |
| 2013/0333383 A1 | | 12/2013 | Schwarck | |
| 2014/0130498 A1 | * | 5/2014 | Randolph | ............... F24T 10/20 166/267 |

FOREIGN PATENT DOCUMENTS

| | | | | |
|---|---|---|---|---|
| EP | 1861663 B1 | * | 8/2011 | .......... F24D 11/0221 |
| JP | 2002115873 A | * | 4/2002 | ............... F24F 5/00 |
| KR | 101860135 B1 | * | 5/2018 | ............. F25B 27/02 |
| WO | WO-2012079078 A2 | * | 6/2012 | ............... F03G 7/04 |
| WO | WO-2012151487 A1 | * | 11/2012 | ............... F24J 3/08 |

* cited by examiner

*Primary Examiner* — Wesley G Harris
(74) *Attorney, Agent, or Firm* — R. Keith Harrison (57) ABSTRACT

Renewable geothermal energy harvesting methods may include distributing at least one working fluid from a ground surface into thermal contact with a subterranean geothermal formation; transferring thermal energy from the geothermal formation to the working fluid; distributing the working fluid to the ground surface; and distributing the working fluid directly to at least one thermal application system. Renewable geothermal energy harvesting systems are also disclosed.

17 Claims, 9 Drawing Sheets

RENEWABLE GEOTHERMAL ENERGY HARVESTING SYSTEMS AND METHODS

FIELD

Illustrative embodiments of the disclosure relate to renewable energy. More particularly, illustrative embodiments of the disclosure relate to renewable geothermal energy harvesting systems and methods for extracting geothermal energy for any of various energy applications.

BACKGROUND

The background description provided herein is solely for the purpose of generally presenting the context of the illustrative embodiments of the disclosure. Aspects of the background description are neither expressly nor impliedly admitted as prior art against the claimed subject matter.

In recent years, measures have been devised and implemented to combat climate change. A major initiative in this effort has been to increase exploitation of "Green Energy" or renewable energy sources. Green energy implements a range of measures to reduce carbon dioxide ($CO_2$) emissions to the atmosphere.

Among the most common types of green energy are the renewable wind power and solar power. These energy sources, however, may be unpredictable and not continually available. Wind and solar energy technologies typically require extensive infrastructure and the associated maintenance and braking power sources. These drawbacks are setbacks in attempts to mitigate climate change.

Still further, there is continuing interest in maximizing the efficiency and utility of geo-thermal energy systems. In one sense, the Earth itself may be viewed as potentially forming an exceedingly large, ready-made energy recovery/storage device or reservoir.

Accordingly, renewable geothermal energy harvesting systems and methods which utilize existing infrastructure to extract geothermal energy for any of various energy applications may be desirable. The geothermal energy harvesting systems and methods may be used in the construction of new geothermal wells or retrofitted to existing wells in the oil and gas industry. The conversion of existing oil and gas wells to geothermal recovery wells to produce green energy using the systems and methods will extend the useful life of marginal or depleted wells.

SUMMARY

Illustrative embodiments of the disclosure are generally directed to renewable geothermal energy harvesting methods. An illustrative embodiment of the methods may include distributing at least one working fluid from a ground surface into thermal contact with a subterranean geothermal formation; transferring thermal energy from the geothermal formation to the working fluid; distributing the working fluid to the ground surface; and distributing the working fluid directly to at least one thermal application system.

Illustrative embodiments of the disclosure are further generally directed to renewable geothermal energy harvesting systems for harvesting thermal energy from a subterranean geothermal formation. An illustrative embodiment of the renewable geothermal energy harvesting systems may include a well casing configured to extend from a ground surface into and in thermal contact with the subterranean geothermal formation. A fluid flow conduit may extend into the well casing. A well annulus may be formed between the fluid flow conduit and the well casing. At least one fluid manifold may be disposed in fluid communication with the well annulus and the fluid flow conduit at the ground surface. A fluid pump may be disposed in fluid communication with the at least one fluid manifold. At least one thermal application system may be disposed in direct fluid communication with the at least one fluid manifold. The thermal application system may be configured to utilize the thermal energy. Accordingly, the fluid manifold may be configured to distribute at least one working fluid from the ground surface into thermal contact with the subterranean geothermal formation through a first one of the fluid flow conduit and the well annulus and from the subterranean geothermal formation to the at least one thermal application system through a second one of the fluid flow conduit and the well annulus responsive to operation of the fluid pump.

In some embodiment, the renewable geothermal energy harvesting system may include a well casing extending from a ground surface into and in thermal contact with the subterranean geothermal formation. A fluid flow conduit may extend from the ground surface into the well casing and in thermal contact with the subterranean geothermal formation. The fluid flow conduit may include a descending conduit segment extending from the ground surface into the well casing. A looped conduit segment may extend from the descending conduit segment. An ascending conduit segment may extend from the looped conduit segment to the ground surface. A fluid pump may be disposed in fluid communication with the descending conduit segment. At least one thermal application system may be disposed in direct fluid communication with the ascending conduit segment. The thermal application system may be configured to utilize the thermal energy. Accordingly, the fluid flow conduit may be configured to distribute at least one working fluid from the ground surface into thermal contact with the subterranean geothermal formation and from the subterranean geothermal formation to the at least one thermal application system through the descending conduit segment, the looped conduit segment and the ascending conduit segment, respectively, of the fluid flow conduit responsive to operation of the fluid pump.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear". "right", "front". "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
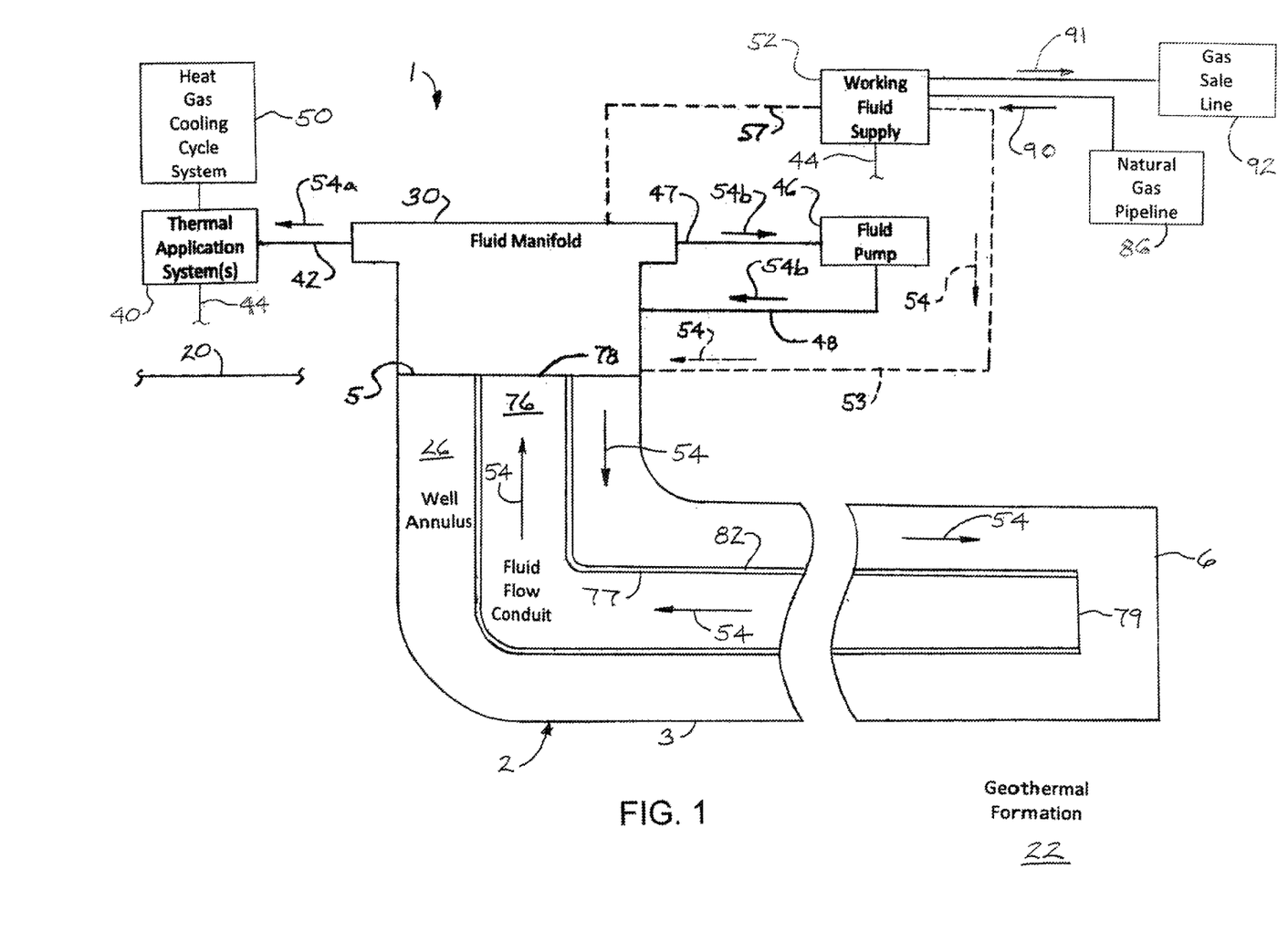
FIG. 1 is a functional block diagram of an illustrative embodiment of the renewable geothermal energy harvesting systems in typical application of the renewable geothermal energy harvesting methods.
Figure 2:
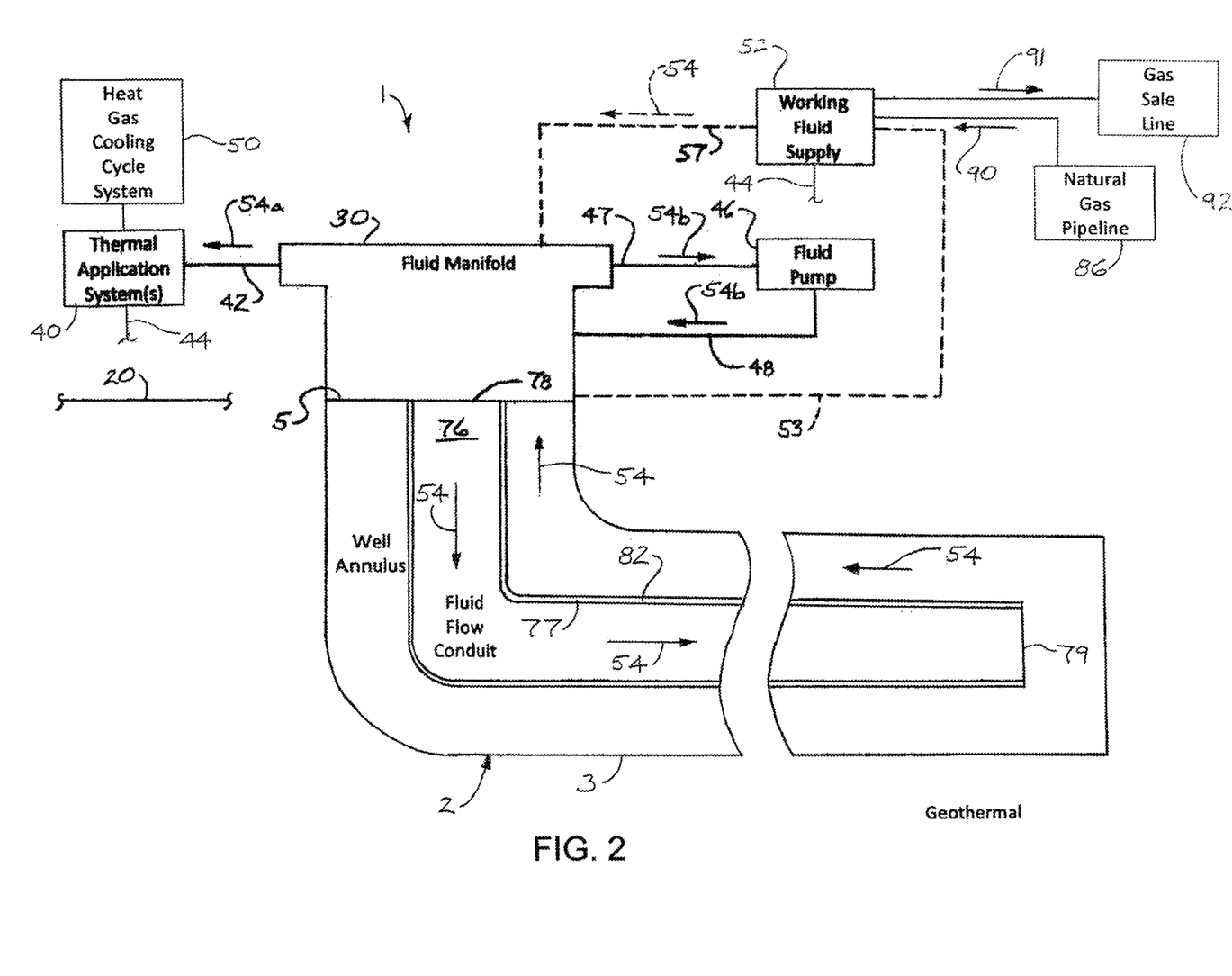
FIG. 2 is a functional block diagram of an illustrative embodiment of the renewable geothermal energy harvesting systems in typical alternative application of the renewable geothermal energy harvesting methods.
Figure 8:
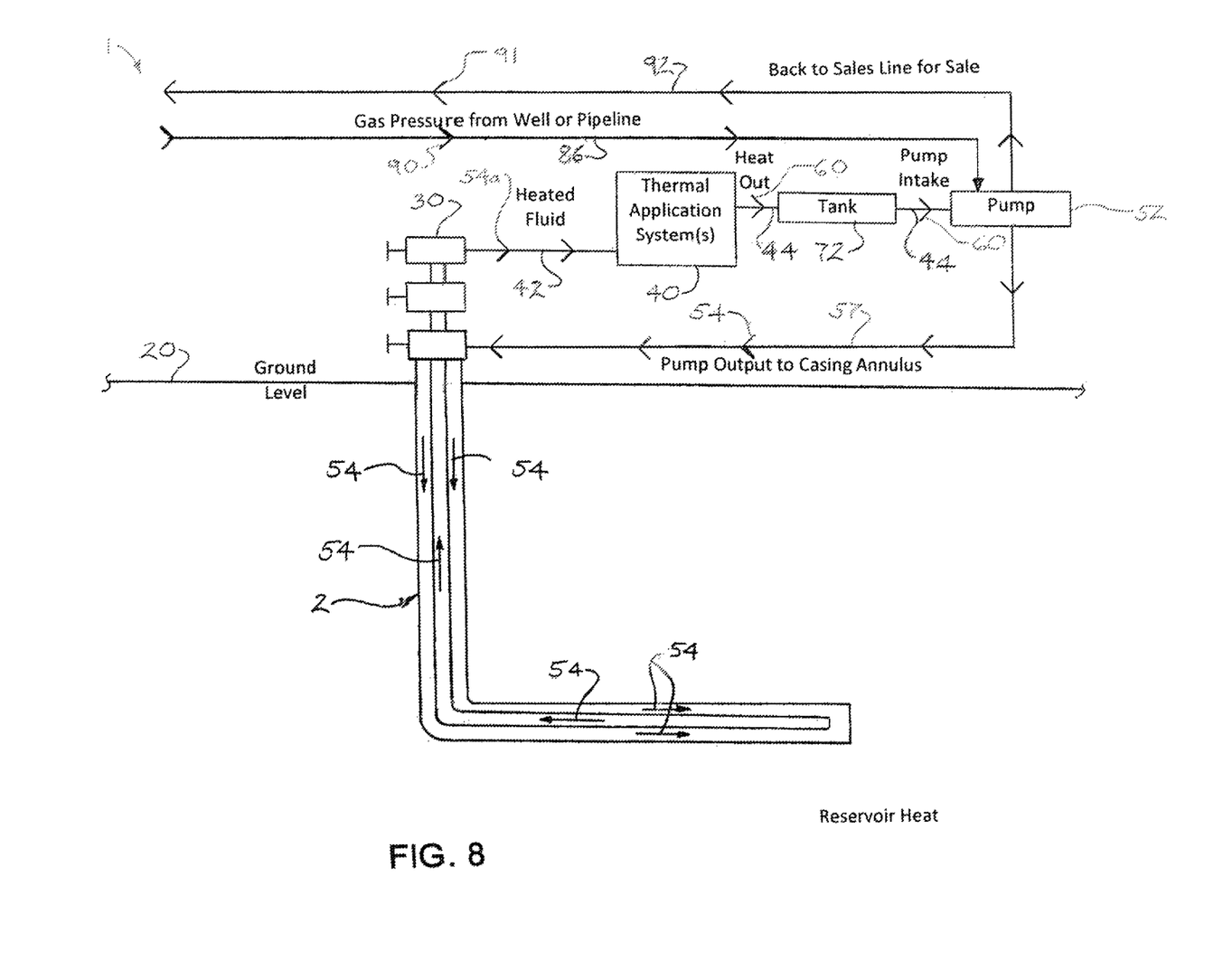
FIG. 8 is a block diagram of an illustrative embodiment of the renewable geothermal energy harvesting systems in which natural gas from a natural gas pipeline is used to pressurize the working fluid through the system.

Referring initially to FIGS. 1, 2 and 8 of the drawings, an illustrative embodiment of the renewable geothermal energy harvesting systems, hereinafter system, is generally indicated by reference numeral 1. As will be hereinafter described, the system 1 may be suitably configured to harvest native thermal energy from a subterranean geothermal formation 22 to a working fluid 54. The harvested thermal energy from the working fluid 54 may be utilized, or used to drive at least one turbine and/or provide working energy for electrical power generation, storage and/or other purposes.

The system 1 may include a subterranean well casing 2. The subterranean well casing 2 may be deployed in a drilled wellbore (not numbered) which extends into the subterranean geothermal formation 22.

In some applications, the subterranean well casing 2 may be part of an existing well in the oil and gas industry or a newly installed well. In the former case, the conversion of existing oil and gas wells to geothermal recovery wells to produce green energy using the systems and methods will extend the useful life of marginal or depleted wells. In the latter case, the wellbore may be drilled and the casing 2 installed as part of a dedicated geothermal well.

The subterranean well casing 2 may have any length necessary to reach the subterranean geothermal formation 22. The wellbore in which the well casing 2 is installed may have any trajectory and may be vertical, horizontal or any angle between vertical and horizontal at any point or points along its length.

The well casing 2 may have a typically steel well casing wall 3 with a proximal casing end 5 which terminates at or near the ground surface 20 and a distal casing end 6 which terminates within the geothermal formation 22. In some embodiments, a well casing lining (not illustrated), typically cement or grout, may line the outer surface of the well casing wall 3. In some embodiments, casing perforations 10 may extend through the well casing wall 3 of the well casing 2. The casing perforations 10 may establish fluid communication between the geothermal formation 22 and the interior of the well casing 2. In some embodiments, the casing perforations 10 may be omitted.

A fluid flow conduit 76, such as a tubing string, for example and without limitation, may extend from the ground surface 20 into the well casing 2. The fluid flow conduit 76 may have a fluid flow conduit wall 77 with a proximal conduit end 78 disposed at or near the ground surface 20 and a distal conduit end 79 disposed in the well casing 2. The fluid flow conduit wall 77 may be fabricated of a material or combination of materials having a low specific heat or high thermal conductivity. In some embodiments, thermal insulation 82 may surround the fluid flow conduit wall 77 of the fluid flow conduit 76.

A well annulus 26 may be formed by and between the interior surface of the well casing wall 3 and the exterior surface of the fluid flow conduit 76. The distal conduit end 79 of the fluid flow conduit 76 may be open to establish fluid communication between the well annulus 26 and the conduit interior of the fluid flow conduit 76.

At least one fluid manifold 30 may be disposed in fluid communication with the proximal conduit end 78 of the fluid flow conduit 76 and the well annulus 26 at the ground surface 20. The fluid flow manifold 30 may facilitate fluid communication between the well annulus 26 and the fluid flow conduit 76 with at least some of the various functional components of the system 1, which will be hereinafter described. The fluid manifold 30 may include conduits and valves which facilitate controlled and regulated flow of the working fluid 54 throughout the system 1, which will be hereinafter described.

At least one working fluid supply 52 may be configured to contain a supply of the working fluid 54. The working fluid 54 may include at least one refrigerant and/or other fluid or combination of fluids having a high specific heat or high boiling point. The working fluid supply 52 may be disposed in fluid communication with the well annulus 26 typically through a first fluid introduction conduit 53 via the fluid manifold 30. In some embodiments, the working fluid supply 52 may be disposed in fluid communication with the fluid flow conduit 76 typically through a second fluid introduction conduit 57 via the fluid manifold 30. The working fluid supply 52 may include at least one fluid pump (not illustrated). Accordingly, as illustrated in FIG. 1, in some applications of the system 1, a primary stream of the working fluid 54 may pumped from the working fluid supply 52 into the well annulus 26 through the first working fluid introduction conduit 53. As illustrated in FIG. 2, in other applications of the system 1, the primary stream of the working fluid 54 may be pumped from the working fluid supply 52 into the fluid flow conduit 76 through the second fluid introduction conduit 57.

At least one thermal application system 40 may be disposed in direct (without intermediary storage facilities) fluid communication with the fluid manifold 30, typically through a distribution conduit 42. The thermal application system 40 may be disposed in direct fluid communication with the fluid manifold 30 and may be configured to utilize the thermal energy. As used herein, "utilize the thermal energy" and like phrases mean that the thermal application system 40 is configured to use the thermal energy to perform work directly or to convert the thermal energy to electrical energy. The electrical energy may be used to perform work and/or stored for later use. For example and without limitation, in some embodiments, the thermal application system 40 may include at least one turbine and/or other system which utilizes the thermal energy harvested by the system 1 to perform work such as for electrical power generation, storage and/or other purposes, typically as will be hereinafter described. In some embodiments, the thermal application system 40 may include a heat gas cooling cycle system 50 which utilizes gas heat to cool fluids. For example and without limitation, in some embodiments, the heat gas cooling cycle system 50 may include a natural gas absorption cooling system which utilizes a cycle of condensation and evaporation using natural gas to produce cooling. The condensation and evaporation cycle of the absorption process may be driven by the heat captured from the subterranean geothermal formation 22. Absorption systems may be available as chillers or chiller/heaters and may be powered by the harvested heat. The heat gas cooling cycle system 50 may be particularly suitable for cooling commercial facilities such as supermarkets, hotels, warehouses, office buildings and institutions such as hospitals, nursing homes, churches, schools, factories and other industrial facilities, for example and without limitation.

In some embodiments, the intake of a fluid recirculation pump 46 may be disposed in fluid communication with the proximal conduit end 78 of the fluid flow conduit 76, typically through a pump inlet conduit 47 via the fluid manifold 30. A fluid discharge conduit 48 may communicate with an output of the fluid recirculation pump 46. The fluid discharge conduit 48 may terminate in fluid communication with the well annulus 26 typically through the fluid manifold 30, for purposes which will be hereinafter described. As illustrated in FIG. 1, in typical application of the system 1, a supply of the working fluid 54 may be placed in the working fluid supply 52. The primary stream of the working fluid 54 may be pumped from the working fluid supply 52 through the first fluid introduction conduit 53 and fluid manifold 30, respectively, into the well annulus 26, and traverse at least a portion of the length of the well casing 2.

As the working fluid 54 flows through the well annulus 26 toward the distal casing end 6 of the well casing 2, thermal energy is transferred from the geothermal formation through the well casing wall 3 to the working fluid 54. In some applications, formation fluid 58 (liquid and/or gas) may flow from the geothermal formation 22 through the casing perforations 10 in the well casing wall 3 into the flowing working fluid 54. Accordingly, additional thermal energy may be transferred from the formation fluid 58 to the working fluid 54, thereby heating the working fluid 54 to a selected target temperature.

As it approaches the distal casing end 6 of the well casing 2, the heated working fluid 54 may flow from the well annulus 26 and enter the fluid flow conduit 76 through the distal conduit end 79. The heated working fluid 54 flows from the distal conduit end 79 through the fluid flow conduit 77 to the proximal conduit end 78. As it flows through the fluid flow conduit 77, some thermal energy may be transferred from the working fluid 54 in the fluid flow conduit 77 to the working fluid 54 in the well annulus 26 to preheat the working fluid 54 in the well annulus 26.

The fluid manifold 30 may distribute at least one application stream 54a of the heated working fluid 54 from the proximal conduit end 78 of the fluid flow conduit 76 typically through the distribution conduit 42 directly to the thermal application system 40. The thermal energy from the application stream 54a of the heated working fluid 54 may drive at least one turbine and/or other thermal application at the thermal application system 40 for electrical power generation, storage and/or other purposes. For example and without limitation, in some applications, the thermal application system 40 may include the heat gas cooling system 50 which utilizes heat gas to cool fluids such as natural gas. The cooled fluids may be used for cooling commercial facilities such as supermarkets, hotels, warehouses, office buildings and institutions such as hospitals, nursing homes, churches, schools, factories and other industrial facilities, for example and without limitation.

As further illustrated in FIG. 1, in some applications, the fluid manifold 30 may distribute at least one recirculation stream 54b of the heated working fluid 54 from the proximal conduit end 78 of the fluid flow conduit 76 to the fluid recirculation pump 46 typically through the pump inlet conduit 47. The fluid recirculation pump 46 may pump the recirculation stream 54b of the heated working fluid 54 back to the well annulus 26 typically through the pump discharge conduit 48 and the fluid manifold 30, respectively. The recirculation stream 54b of the heated working fluid 54 may thus flow through the well annulus 26 toward the distal casting end 6 of the well casing 2 such that additional thermal energy is transferred from the geothermal formation 22 to the working fluid 54. The twice-heated working fluid 54 may then enter the distal conduit end 79 and flow through the fluid flow conduit 77 back to the fluid manifold 30. The twice-heated working fluid 54 may then be distributed in the application stream 54a directly to the thermal application system 40 for thermal transfer and utilization. Additionally or alternatively, the recirculation stream 54b of the heated working fluid 54 may again be distributed from the fluid manifold 30 to the fluid recirculation pump 46 and recirculated a third time through the well annulus 26 and fluid flow conduit 77 for additional transfer of thermal energy from the geothermal formation 22 to the working fluid 54. The working fluid 54 may be recirculated in the foregoing manner as many times as is desired to achieve the selected target temperature of the working fluid 54 prior to distributing the application stream 54a to the thermal application system 40.

As particularly illustrated in FIG. 8, in some embodiments, a natural gas pipeline 86 may be disposed in fluid communication with the working fluid supply 52. A gas inlet conduit 87 may connect the natural gas pipeline 86 to the working fluid supply 52. A gas sale line 92 may be connected to the working fluid supply 52. A fluid return conduit 44 may connect the working fluid supply 52 to the thermal application system 40. Accordingly, in operation of the system 1, an inlet gas stream 90 may flow from the natural gas pipeline 86 to the working fluid supply 52 typically through the gas inlet conduit 87. The flow pressure of the inlet gas stream 90 may operate the pump of the working fluid supply 52 and/or pressurize the working fluid 54 for pumping of the working fluid 54 throughout the system 1. A return fluid stream 60 of the working fluid 54 may flow from the thermal application system 40 back to the working fluid supply 52. At the working fluid supply 52, the natural gas may be removed from the return fluid stream 60 and routed to the gas sale line 92 as a return gas stream 91. The inlet gas stream 90 may continue to flow from the natural gas pipeline 86 typically through the gas inlet conduit 87 for continued circulation and pressurization of the working fluid 54 through the system 1.

As illustrated in FIG. 2, in an alternative application of the system 1, the working fluid 54 may be pumped from the working fluid supply 52 to the fluid flow conduit 76 typically through the second fluid introduction conduit 57 and the fluid manifold 30, respectively. The working fluid 54 may then flow through the fluid flow conduit 76, discharging into the well annulus 26 at the distal conduit end 79 of the fluid flow conduit 76. As it subsequently flows through the well annulus 26 back toward the ground surface 20, the working fluid 54 may be heated by transfer of thermal energy from the geothermal formation 22 and the formation fluid 58 which may enter the well annulus 26 through the casing perforations 10. Some thermal energy may be transferred from the heated working fluid 54 in the well annulus 26 to the preheated working fluid 54 in the fluid flow conduit 76. As the heated working fluid 54 is discharged from the proximal casing end 5 of the well casing 2, the fluid manifold 30 may distribute an application stream 54a of the heated working fluid 54 directly to the thermal application system 40.

In some applications, the fluid manifold 30 may distribute a recirculation stream 54b of the heated working fluid 54 from the well annulus 26 to the fluid recirculation pump 46 typically through the pump discharge conduit 48. The fluid recirculation pump 46 may pump the recirculation stream 54b back into the fluid flow conduit 76 for additional transfer of thermal energy from the geothermal formation 22 to the working fluid 54 before distribution of the application stream 54a of the heated working fluid 54 to the thermal application system 40. The working fluid 54 may be recirculated in the foregoing manner as many times as is desired to achieve the selected temperature of the working fluid 54 prior to distributing the application stream 54a to the thermal application system 40.

Figure 3:
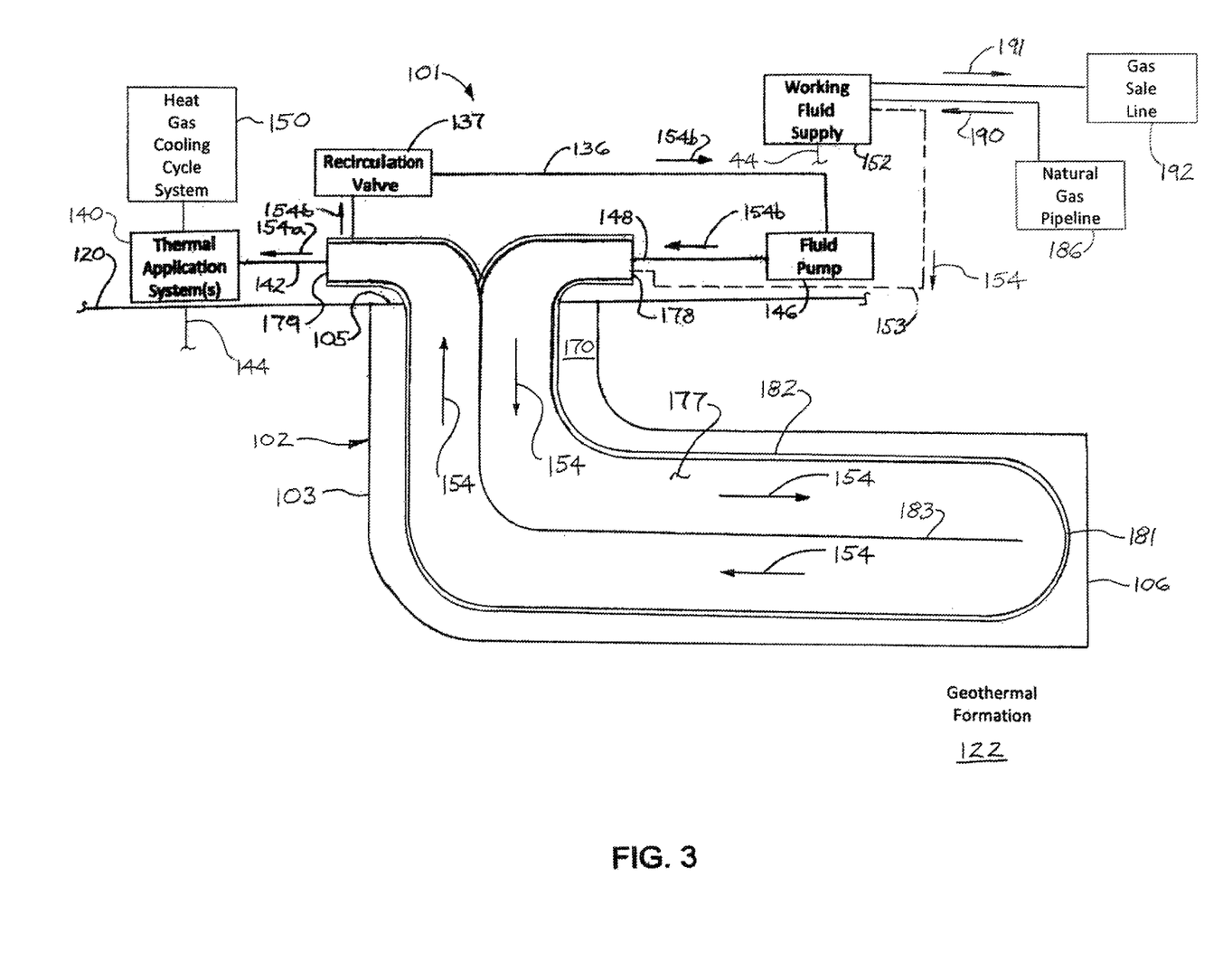
FIG. 3 is a functional block diagram of an alternative illustrative embodiment of the renewable geothermal energy harvesting systems in typical application of the renewable geothermal energy harvesting methods.

Referring next to FIG. 3 of the drawings, an alternative illustrative embodiment of the renewable geothermal energy harvesting systems is generally indicated by reference numeral 101. In the system 101, elements which are analogous to the respective elements of the system 1 that was heretofore described with respect to FIGS. 1 and 2 are designated by the same respective numerals in the 101-199 series in FIG. 3.

The system 101 may include a fluid flow conduit 176 which is deployed into a wellbore 170 typically lined by a subterranean well casing 102. The fluid flow conduit 176 may include a fluid flow conduit wall 177 fabricated of a material or combination of materials having a low specific heat or high thermal conductivity. The fluid flow conduit wall 177 may have a proximal conduit end 178 and a distal conduit end 179 at or above the ground surface 120. A descending conduit segment 180 may extend from the proximal conduit end 178 into the well casing 102. A looped conduit segment 181 may extend from the descending conduit segment 180. The looped conduit segment 181 may be disposed at or proximate to the distal casing end 106 of the well casing 102. An ascending conduit segment 182 may extend from the looped conduit segment 181 in parallel, adjacent relationship with the descending conduit segment 180 and toward the proximal casing end 105 of the well casing 102. The distal conduit end 179 may terminate the ascending conduit segment 182. In some embodiments, the ascending conduit segment 182 may be disposed in thermal contact with the descending conduit segment 180 along substantially its entire length. Accordingly, a conduit partition 183 may separate the interior of the descending conduit segment 180 from the interior of the ascending conduit segment 182. The conduit partition 183 of the fluid flow conduit 176 may be fabricated of a material or combination of materials having a low specific heat or high thermal conductivity.

At least one thermal application system 140 may be disposed in fluid communication with the distal conduit end 179 on the ascending segment 182 of the fluid flow conduit 176, typically through a distribution conduit 142. The thermal application system 140 may be disposed in direct fluid communication with the distal conduit end 179 of the fluid flow conduit 176.

A working fluid supply 152 which contains a supply of the working fluid 154 may be disposed in fluid communication with the proximal conduit end 178 of the fluid flow conduit 176 typically through a fluid introduction conduit 153. The working fluid supply 152 may be configured to pump the working fluid 154 through the fluid introduction conduit 153 into the proximal conduit end 178 of the fluid flow conduit 176.

In some embodiments, a recirculation valve 137 may be disposed in fluid communication with the distal conduit end 179 of the fluid flow conduit 176. A fluid recirculation pump 146 may be disposed in fluid communication with the recirculation valve 137 typically through a recirculation conduit 136. The fluid recirculation pump 146 may be disposed in fluid communication with the proximal conduit end 178 of the fluid flow conduit 176 typically through a pump discharge conduit 148.

In typical application of the system 101, the fluid flow conduit 176 may be deployed into the well casing 102. A primary stream of the working fluid 154 may be pumped from the working fluid supply 152 typically through the fluid introduction conduit 153 into the proximal conduit end 178 of the fluid flow conduit 176. The working fluid 154 thus flows through the descending conduit segment 180, the looped conduit segment 181 and the ascending conduit segment 182. Simultaneously, thermal energy may be transferred from the geothermal formation 122 by conduction through the fluid flow conduit wall 177 of the fluid flow conduit 176. In some applications, the formation fluid 158 may flow from the geothermal formation 122 through the casing perforations 110 in the well casing wall 103 into contact with the fluid flow conduit 176. Accordingly, additional thermal energy may be transferred from the formation fluid 158 to the working fluid 154 in the fluid flow conduit 176, thereby heating the working fluid 154. An application stream 154a of the heated working fluid 154 flows from the distal conduit end 179 of the ascending conduit segment 182 to the thermal application system 140 typically through the distribution conduit 142 typically for purposes which were heretofore described. In some applications, the thermal application system 140 may include a heat gas cooling cycle system 150. The conduit partition 183 may transfer thermal energy from the working fluid 154 flowing through the ascending conduit segment 182 to the working fluid 154 flowing through the descending conduit segment 180 to preheat the working fluid 154.

In some applications, the recirculation valve 137 may distribute at least one recirculation stream 154b of the heated working fluid 154 from the distal conduit end 179 of the fluid flow conduit 176 to the fluid recirculation pump 146 typically through the recirculation conduit 136. The fluid recirculation pump 146 may pump the recirculation stream 154b of the heated working fluid 154 back to the proximal conduit end 178 of the fluid flow conduit 176 typically through the pump discharge conduit 148. The recirculation stream 154b of the heated working fluid 154 may thus flow from the proximal conduit end 178 to the distal conduit end 179 of the fluid flow conduit 176 such that additional thermal energy is transferred from the geothermal formation 122 to the working fluid 154. The twice-heated working fluid 154 may then be distributed in the application stream 154a to the thermal application system 140 for thermal transfer and utilization of the thermal energy. Additionally or alternatively, the recirculation stream 154b of the heated working fluid 154 may again be distributed by the recirculation valve 137 to the fluid recirculation pump 146 and recirculated a third time through the fluid flow conduit 176 for additional transfer of thermal energy from the geothermal formation 122 to the working fluid 154. The working fluid 154 may be recirculated in the foregoing manner as many times as is desired to achieve the selected target temperature of the working fluid 154 prior to distributing the application stream 154a to the thermal application system 140.

Figure 4:
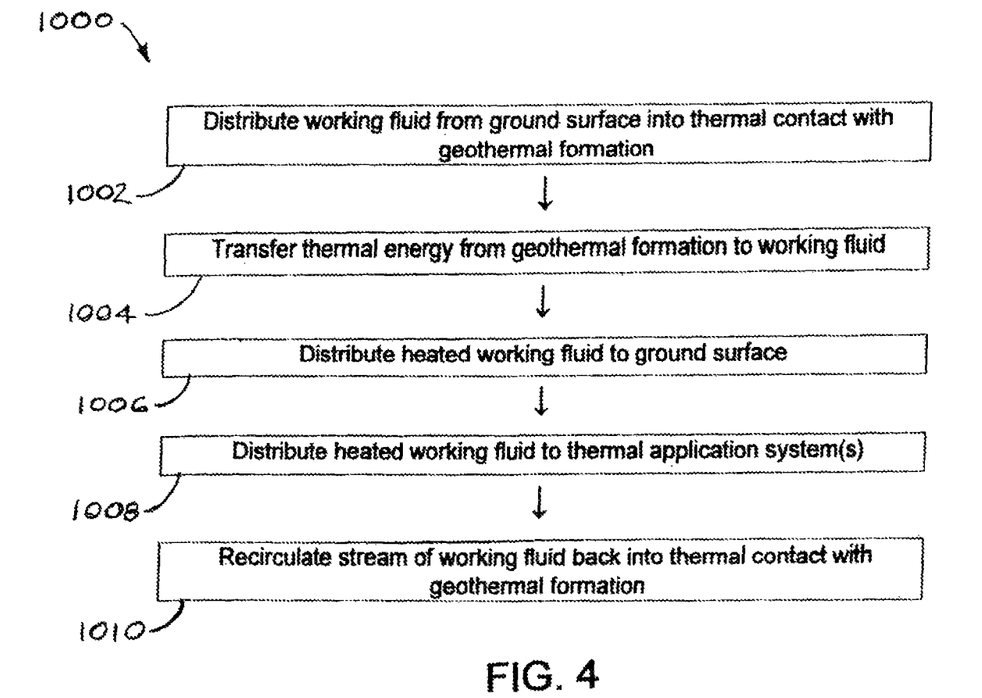
FIG. 4 is a flow diagram of an illustrative embodiment of the renewable geothermal energy harvesting methods.

Referring next to FIG. 4 of the drawings, a flow diagram 1000 of an illustrative embodiment of the renewable geothermal energy harvesting methods is illustrated. At Step 1002, a working fluid may be distributed from the ground surface into thermal contact with a subterranean geothermal formation.

At Step 1004, thermal energy may be transferred from the geothermal formation to the working fluid.

At Step 1006, the heated working fluid may be distributed to the ground surface.

At Step 1008, the heated working fluid may be distributed directly to at least one thermal application system for utilization of the thermal energy. The thermal application system may extract the thermal energy from the heated working fluid and use the thermal energy to perform work directly or convert the thermal energy into electrical energy and use and/or store the energy. In some applications, the thermal application system may include a heat gas cooling cycle system.

At Step 1010, in some embodiments, at least one stream of the working fluid may be recirculated back into thermal contact with the geothermal formation at least one time prior to distribution of the working fluid to the thermal application system.

In some embodiments, the renewable geothermal energy harvesting method 1000 may consist essentially of Steps 1002, 1004, 1006, 1008 and optionally, Step 1010.

Figure 5:
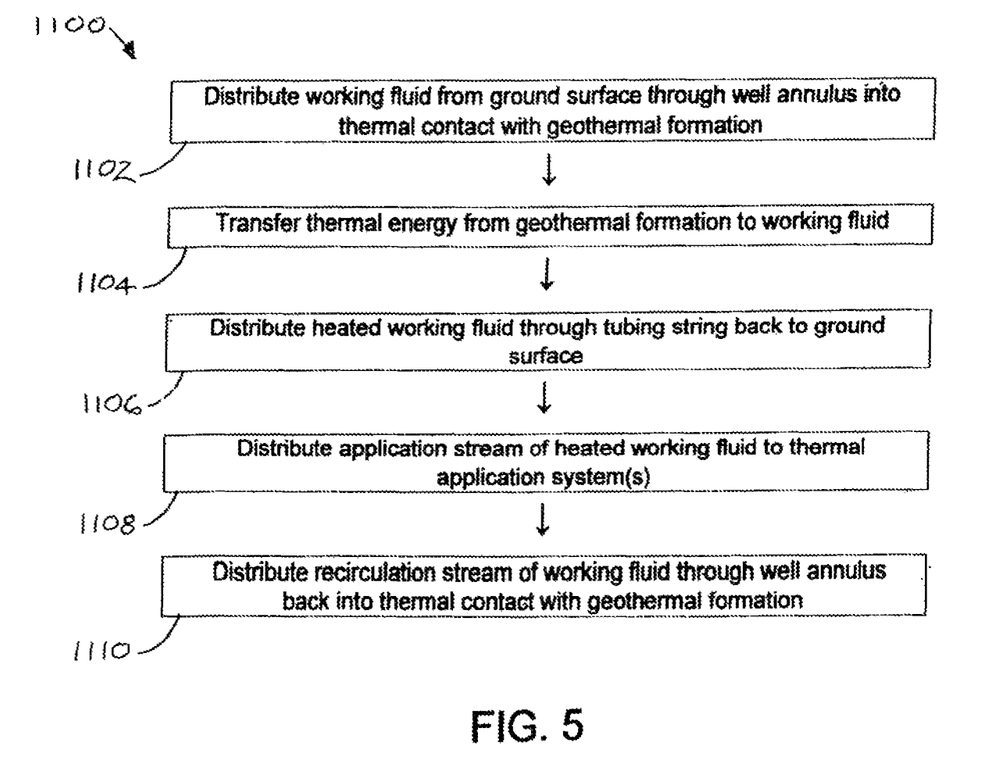
FIG. 5 is a flow diagram of an illustrative embodiment of the renewable geothermal energy harvesting methods in which the working fluid is distributed down the well annulus to the geothermal formation and the heated working fluid is distributed up the tubing string to the ground surface.

Referring next to FIG. 5 of the drawings, a flow diagram 1100 of an illustrative embodiment of the renewable geothermal energy harvesting methods is illustrated. At Step 1102, a working fluid may be distributed from the ground surface through a well annulus into thermal contact with a subterranean geothermal formation.

At Step 1104, thermal energy may be transferred from the geothermal formation to the working fluid.

At Step 1106, the heated working fluid may be distributed through a tubing string or other fluid flow conduit back to the ground surface.

At Step 1108, at least one application stream of the heated working fluid may be distributed directly to at least one thermal application system for utilization of the thermal energy. The thermal application system may utilize the thermal energy typically by extracting the thermal energy from the heated working fluid and using the thermal energy to perform work directly, or by converting the thermal energy into electrical energy and using and/or storing the electrical energy for later use. In some applications, the thermal application system may include a heat gas cooling cycle system.

At Step 1110, at least one recirculation stream of the working fluid may be distributed through the well annulus back into thermal contact with the geothermal formation at least one time prior to distribution of the working fluid to the thermal application system.

In some embodiments, the renewable geothermal energy harvesting method 1100 may consist essentially of Steps 1102, 1104, 1106, 1108 and optionally, Step 1110.

Figure 6:
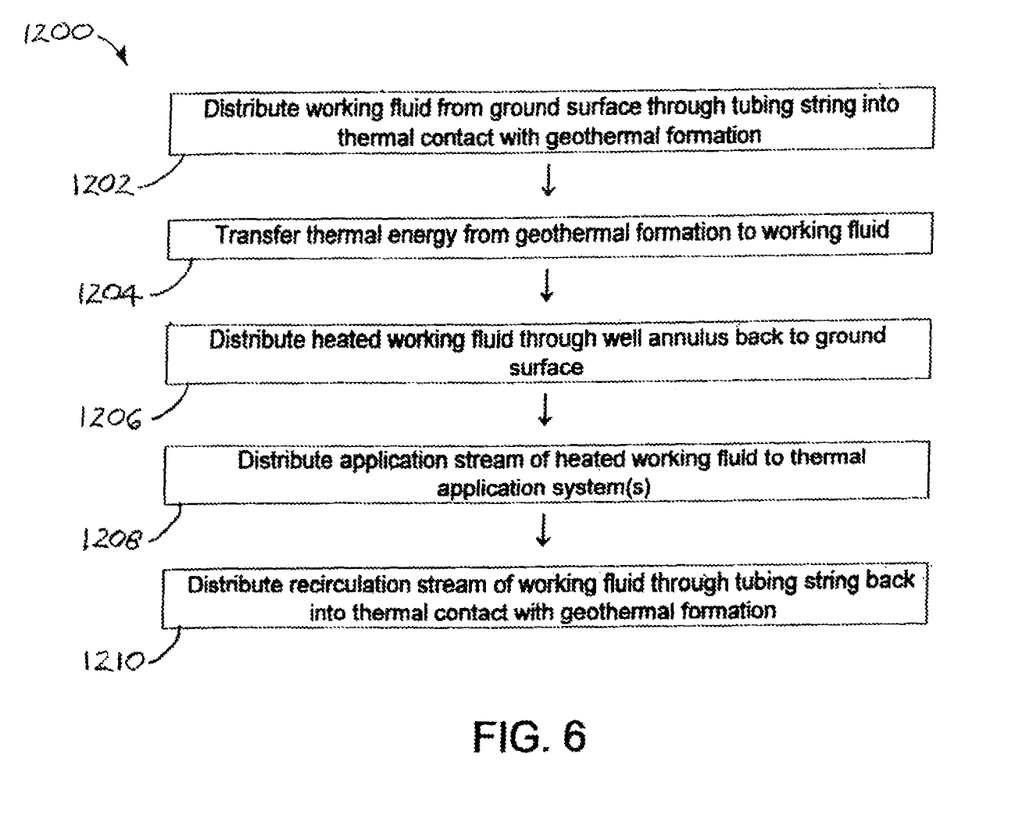
FIG. 6 is a flow diagram of an illustrative embodiment of the renewable geothermal energy harvesting methods in which the working fluid is distributed down the tubing string to the geothermal formation and then up the well annulus to the ground surface.

Referring next to FIG. 6 of the drawings, a flow diagram 1200 of an alternative illustrative embodiment of the renewable geothermal energy harvesting methods is illustrated. At Step 1202, a working fluid may be distributed from the ground surface through a tubing string or other fluid flow conduit into thermal contact with a subterranean geothermal formation.

At Step 1204, thermal energy may be transferred from the geothermal formation to the working fluid.

At Step 1206, the heated working fluid may be distributed through a well annulus back to the ground surface.

At Step 1208, at least one application stream of the heated working fluid may be distributed directly to at least one thermal application system for utilization of the thermal energy. The thermal application system may utilize the thermal energy typically by extracting the thermal energy from the heated working fluid and using the thermal energy to perform work directly, or by converting the thermal energy into electrical energy and using and/or storing the electrical energy for later use. In some applications, the thermal application system may include a heat gas cooling cycle system.

At Step 1210, at least one recirculation stream of the working fluid may be distributed through the tubing string or other fluid flow conduit into thermal contact with the geothermal formation at least one time prior to distribution of the working fluid to the thermal application system.

In some embodiments, the renewable geothermal energy harvesting method 1200 may consist essentially of Steps 1202, 1204, 1206, 1208 and optionally, Step 1210.

Figure 7:
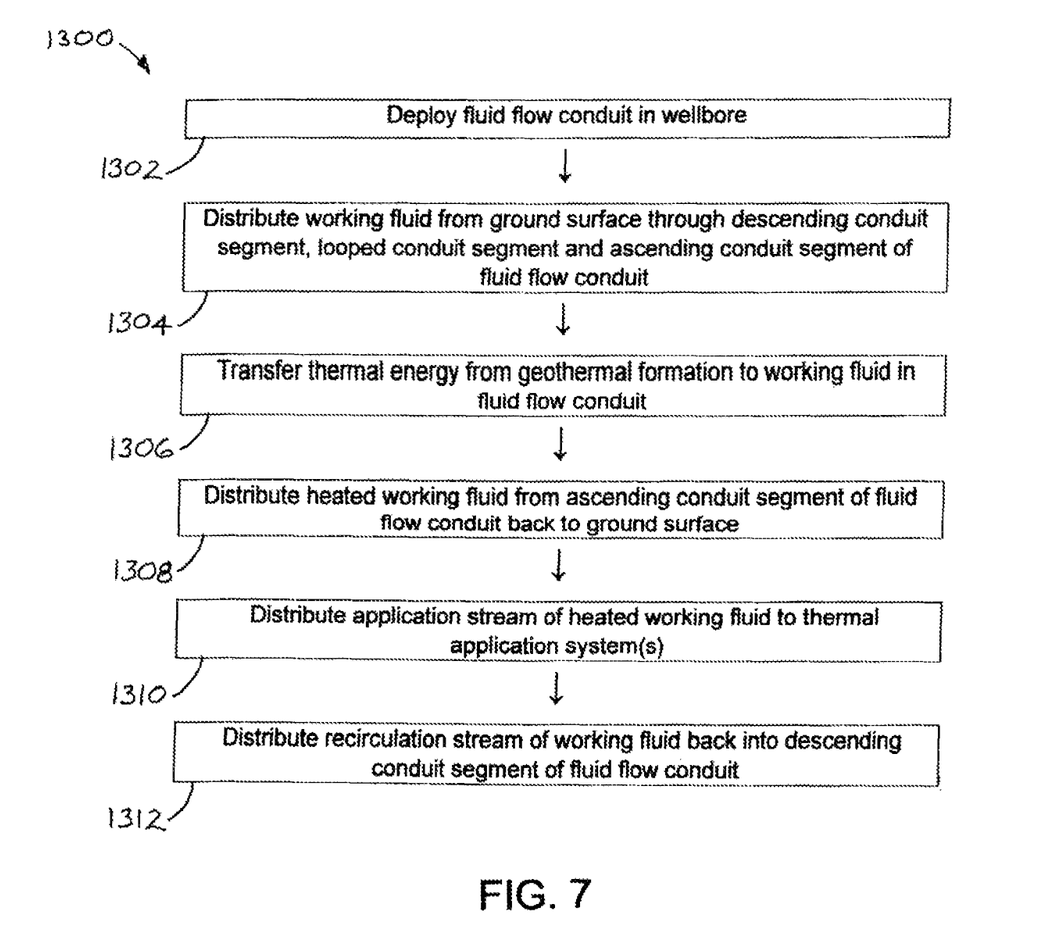
FIG. 7 is a flow diagram of an alternative illustrative embodiment of the renewable geothermal energy harvesting methods using the renewable geothermal energy harvesting system illustrated in FIG. 3.

Referring next to FIG. 7 of the drawings, a flow diagram 1300 of another alternative illustrative embodiment of the renewable geothermal energy harvesting methods is illustrated. At Step 1302, a fluid flow conduit may be deployed in a wellbore. The fluid flow conduit may include a descending conduit segment having a proximal conduit end, a looped conduit segment extending from the descending conduit segment and an ascending conduit segment having a distal conduit end extending from the looped conduit segment.

At Step 1304, a working fluid may be distributed from the ground surface through the descending conduit segment, the looped conduit segment and the ascending conduit segment of the fluid flow conduit into thermal contact with a subterranean geothermal formation.

At Step 1306, thermal energy may be transferred from the geothermal formation to the working fluid in the fluid flow conduit.

At Step 1308, the heated working fluid may be distributed through the ascending conduit segment of the fluid flow conduit back to the ground surface.

At Step 1310, at least one application stream of the heated working fluid may be distributed directly to at least one thermal application system for utilization of the thermal energy. The thermal application system may utilize the thermal energy typically by extracting the thermal energy from the heated working fluid and using the thermal energy to perform work directly, or by converting the thermal energy into electrical energy and using and/or storing the electrical energy for later use. In some applications, the thermal application system may include a heat gas cooling cycle system.

At Step 1312, at least one recirculation stream of the working fluid may be distributed back through the descending conduit segment of the fluid flow conduit into thermal contact with the geothermal formation at least one time prior to distribution of the working fluid to the thermal application system.

In some embodiments, the renewable geothermal energy harvesting method 1300 may consist essentially of Steps 1302, 1304, 1306, 1308, 1310 and optionally. Step 1312.

Figure 9:
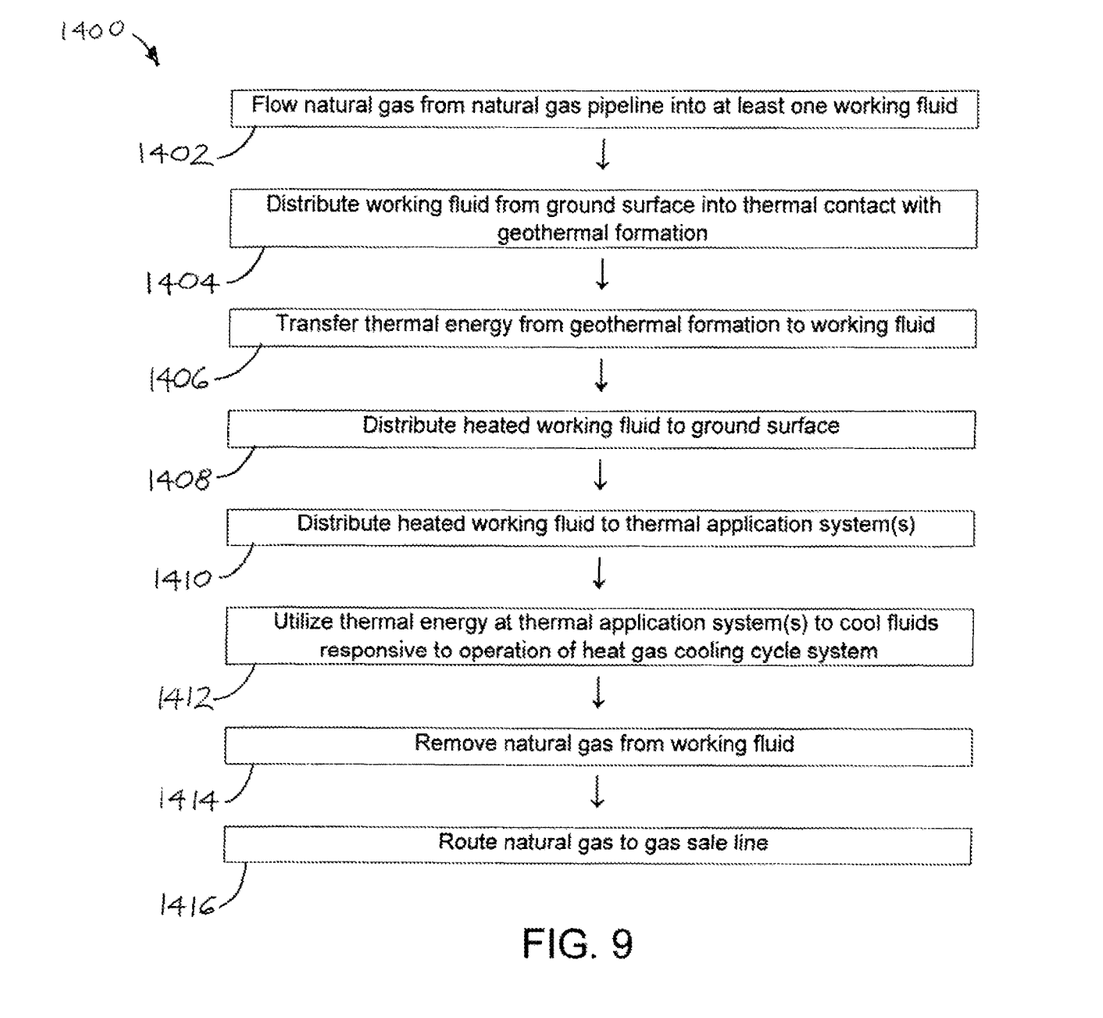
FIG. 9 is a flow diagram of an illustrative embodiment of the renewable geothermal energy harvesting methods in which natural gas from a natural gas pipeline is used to pressurize the working fluid through the system.

Referring next to FIG. 9 of the drawings, a flow diagram 1400 of an illustrative embodiment of the renewable geothermal energy harvesting methods in which natural gas from a natural gas pipeline is used to pump and/or pressurize the working fluid through the system is illustrated. At Step 1402, flowing natural gas may be introduced from a natural gas pipeline into at least one working fluid.

At Step 1404, the working fluid may be distributed from the ground surface into thermal contact with a subterranean geothermal formation.

At Step 1406, thermal energy may be transferred from the geothermal formation to the working fluid.

At Step 1408, the heated working fluid may be distributed to the ground surface.

At Step 1410, the heated working fluid may be distributed directly to at least one thermal application system for utilization of the thermal energy.

At Step 1412, the thermal application system may extract the thermal energy from the heated working fluid and use the thermal energy to perform work directly or convert the thermal energy into electrical energy and use and/or store the energy. In some applications, the thermal application system may include a heat gas cooling cycle system.

In some embodiments, at least one stream of the working fluid may be recirculated back into thermal contact with the geothermal formation at least one time prior to distribution of the working fluid to the thermal application system.

At Step 1414, the natural gas may be removed from the working fluid.

At Step 1416, the natural gas removed from the working fluid at Step 1414 may be routed to a gas sale line.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A renewable geothermal energy harvesting and gas cooling method utilizing a well, comprising:
flowing natural gas into at least one working fluid;
distributing the at least one working fluid from a ground surface through the well into thermal contact with a subterranean geothermal formation;
transferring thermal energy from the subterranean geothermal formation to the at least one working fluid;
distributing the at least one working fluid from the subterranean geothermal formation back to the ground surface;
distributing the at least one working fluid directly to at least one thermal application system, the at least one thermal application system including a heat gas cooling cycle system comprising a natural gas absorption cooling system configured to utilize the thermal energy to cool fluids by utilizing a cycle of condensation and evaporation using the natural gas to produce cooling; and
utilizing the thermal energy at the at least one thermal application system to cool the fluids responsive to operation of the heat gas cooling cycle system.

2. The method of claim 1, further comprising recirculating at least one recirculation stream of the at least one working fluid back into thermal contact with the subterranean geothermal formation at least one time prior to the distributing the at least one working fluid directly to the at least one thermal application system.

3. The method of claim 1, wherein the distributing the at least one working fluid from the ground surface into thermal contact with the subterranean geothermal formation comprises distributing the at least one working fluid from the ground surface through a well annulus into thermal contact with the subterranean geothermal formation and wherein the distributing the at least one working fluid from the subterranean geothermal formation back to the ground surface comprises distributing the at least one working fluid through a fluid flow conduit to the ground surface.

4. The method of claim 1, wherein the distributing the at least one working fluid from the ground surface into thermal contact with the subterranean geothermal formation comprises distributing the at least one working fluid from the ground surface through a fluid flow conduit into thermal contact with the subterranean geothermal formation and wherein the distributing the at least one working fluid from the subterranean geothermal formation back to the ground surface comprises distributing the at least one working fluid through a well annulus to the ground surface.

5. The method of claim 1, wherein the distributing the at least one working fluid from the ground surface into thermal contact with the subterranean geothermal formation and the distributing the at least one working fluid from the subterranean geothermal formation back to the ground surface comprises distributing the at least one working fluid through a descending conduit segment, a looped conduit segment and an ascending conduit segment, respectively, of a fluid flow conduit.

6. The method of claim 1, further comprising transferring thermal energy from formation fluid from the subterranean geothermal formation into the at least one working fluid by flowing native formation fluid from the geothermal formation into the at least one working fluid.

7. The method of claim 1, wherein utilizing the thermal energy at the at least one thermal application system further comprises driving at least one turbine.

8. The method of claim 1, wherein the distributing the at least one working fluid from the ground surface into thermal contact with the subterranean geothermal formation comprises distributing the at least one working fluid from at least one fluid manifold at the ground surface into thermal contact with the subterranean geothermal formation, the distributing the at least one working fluid from the subterranean geothermal formation back to the ground surface comprises distributing the at least one working fluid from the subterranean geothermal formation back to the at least one fluid manifold and the distributing the at least one working fluid to the at least one thermal application system comprises distributing the at least one working fluid from the at least one fluid manifold to the at least one thermal application system.

9. A renewable geothermal energy harvesting and gas cooling method utilizing a horizontal well, comprising:
forming the horizontal well in a subterranean geothermal formation;
installing a well casing in the horizontal well;
inserting an insulated fluid flow conduit into the well casing of the horizontal well, the well casing having a proximal casing end at a ground surface and a subterranean distal casing end, the fluid flow conduit having a proximal conduit end and a distal conduit end;
flowing natural gas from a natural gas pipeline into at least one working fluid comprising refrigerant;
distributing the at least one working fluid comprising refrigerant from the ground surface through the horizontal well into thermal contact with the subterranean geothermal formation;
transferring thermal energy from the subterranean geothermal formation to the at least one working fluid;
distributing the at least one working fluid from the subterranean geothermal formation back to the ground surface;
wherein the at least one working fluid flows through the fluid flow conduit in at least one of the distributing the at least one working fluid from the ground surface into thermal contact with the subterranean geothermal formation and the distributing the at least one working fluid from the subterranean geothermal formation back to the ground surface;
distributing the at least one working fluid to at least one thermal application system, the at least one thermal application system including a heat gas cooling cycle system comprising a natural gas absorption cooling system configured to utilize the thermal energy to cool fluids by utilizing a cycle of condensation and evaporation using the natural gas to produce cooling;
utilizing the thermal energy at the at least one thermal application system to cool the fluids responsive to operation of the heat gas cooling cycle system; and
removing the natural gas from the at least one working fluid.

10. The method of claim 9, further comprising placing at least one fluid manifold in fluid communication with the proximal conduit end of the fluid flow conduit and the proximal casing end of the well casing at the ground surface, and wherein the distributing the at least one working fluid from the ground surface into thermal contact with the subterranean geothermal formation comprises distributing the at least one working fluid from the ground surface through the at least one fluid manifold and through a well annulus between the fluid flow conduit and the well casing and the distributing the at least one working fluid from the geothermal formation back to the ground surface comprises distributing the at least one working fluid from the geothermal formation through the fluid flow conduit and the at least one fluid manifold to the ground surface.

11. The method of claim 9, further comprising placing at least one fluid manifold in fluid communication with the proximal conduit end of the fluid flow conduit and the proximal casing end of the well casing at the ground surface, and wherein the distributing the at least one working fluid from the ground surface into thermal contact with the subterranean geothermal formation comprises distributing the at least one working fluid from the ground surface through the at least one fluid manifold and through the fluid flow conduit and the distributing the at least one working fluid from the geothermal formation back to the ground surface comprises distributing the at least one working fluid from the geothermal formation through a well annulus between the fluid flow conduit and the well casing and the at least one fluid manifold to the ground surface.

12. The method of claim 9, further comprising recirculating at least one recirculation stream of the at least one working fluid back into thermal contact with the subterranean geothermal formation at least one time prior to the distributing the at least one working fluid to the at least one thermal application system.

13. The method of claim 9, further comprising transferring thermal energy from formation fluid into the at least one working fluid by flowing native formation fluid from the subterranean geothermal formation through casing perforations in the well casing into the at least one working fluid.

14. The method of claim 9, wherein utilizing the thermal energy at the at least one thermal application system further comprises driving at least one turbine.

15. The method of claim 9, wherein the distributing the at least one working fluid from the ground surface into thermal contact with the subterranean geothermal formation comprises distributing the at least one working fluid from at least one fluid manifold at the ground surface into thermal contact with the subterranean geothermal formation, the distributing the at least one working fluid from the subterranean geothermal formation back to the ground surface comprises distributing the at least one working fluid from the subterranean geothermal formation back to the at least one fluid manifold and the distributing the at least one working fluid to the at least one thermal application system comprises distributing the at least one working fluid from the at least one fluid manifold to the at least one thermal application system.

16. A renewable geothermal energy harvesting and gas cooling method utilizing a well, comprising:
flowing natural gas from a natural gas pipeline into at least one working fluid comprising refrigerant;
distributing the at least one working fluid from a ground surface through the well into thermal contact with a subterranean geothermal formation;
transferring thermal energy from the subterranean geothermal formation to the at least one working fluid;
distributing the at least one working fluid from the subterranean geothermal formation back to the ground surface;
distributing the at least one working fluid directly to at least one thermal application system, the at least one thermal application system including a heat gas cooling cycle system configured to utilize the thermal energy to cool fluids;
utilizing the thermal energy at the at least one thermal application system to cool the fluids responsive to operation of the heat gas cooling cycle system; and
removing the natural gas from the at least one working fluid.

17. The method of claim 16, further comprising routing the natural gas to a gas sale line after removing the natural gas from the at least one working fluid.

* * * * *